United States Patent [19]

Maylandt

[11] 4,238,030
[45] Dec. 9, 1980

[54] ELECTRICALLY CONDUCTIVE COVER SHEATH FOR DIELECTRIC RECORD DISCS AND THE LIKE

[76] Inventor: Helmut Maylandt, Sachsenweg 6, 7310 Plochingen, Fed. Rep. of Germany

[21] Appl. No.: 910,289

[22] Filed: May 30, 1978

Related U.S. Application Data

[63] Continuation-in-part of Ser. No. 833,454, Sep. 15, 1977, abandoned.

[30] Foreign Application Priority Data

Aug. 24, 1976 [DE] Fed. Rep. of Germany ....... 2642908

[51] Int. Cl.² .................. H05F 3/00; B65D 85/30
[52] U.S. Cl. .................. 206/313; 206/328; 206/444; 361/212
[58] Field of Search ........... 206/444, 313, 309, 331, 206/328; 312/10; 361/212; 229/62

[56] References Cited

U.S. PATENT DOCUMENTS

| | | | |
|---|---|---|---|
| 3,275,158 | 9/1966 | Glass et al. | 312/10 |
| 3,422,952 | 1/1969 | George | 206/313 |
| 3,784,957 | 1/1974 | Bailey | 206/331 |
| 3,941,245 | 3/1976 | Oliverius | 229/62 |
| 4,037,267 | 7/1977 | Kisor | 206/331 |
| 4,038,693 | 7/1977 | Huffine et al. | 206/444 |

Primary Examiner—William T. Dixson, Jr.
Attorney, Agent, or Firm—Frishauf, Holtz, Goodman & Woodward

[57] ABSTRACT

In order to distribute electric charges that build up on the surface of record discs and also to drain them away, a cover sheath is provided for storage of the record disc having at least its surface in contact with the surface of the inserted record disc made of conducting material. The cover sheath can be made of metallized paper or metallized synthetic resin film on the same kind of machinery as is used for making conventional sound record dust covers of paper of synthetic film. If the material is metallized on only one side, it is provided with a cuff around its opening so as to lead charges to the outside where they can be drained away by a conducting storage structure. If the material is metallized on both sides, instead of providing a cuff, electrical connection of the two metallized layers should be provided. Normal handling of sound records kept in non-conducting cover sheaths produces electric charges providing a field strength of the order of 100,000 V/m at 5 am from the record disc surface, which explains the generation of crackling noises when the record is played. The charges can be reduced greatly by insertion in a metallized cover sheath and still more if the cover sheath is grounded, even through a poor conductor, during normal storage.

6 Claims, 5 Drawing Figures

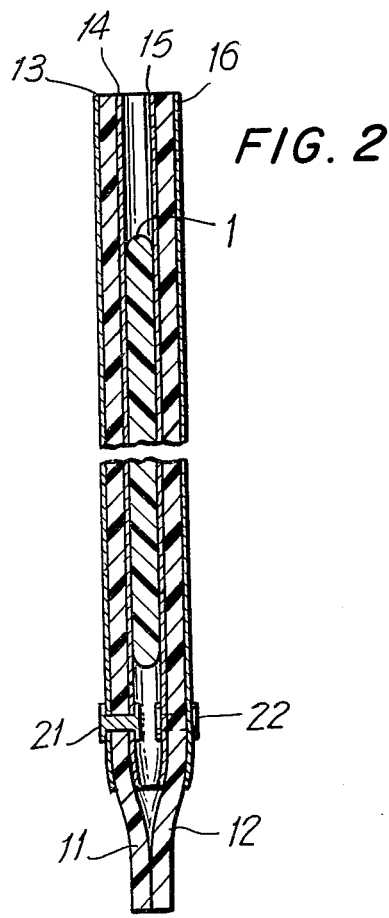
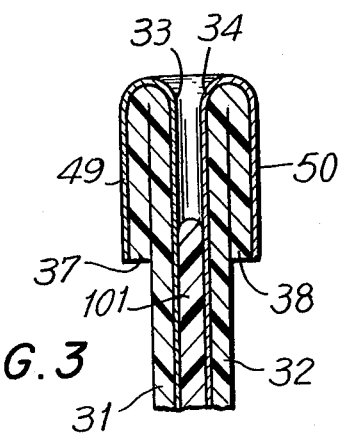
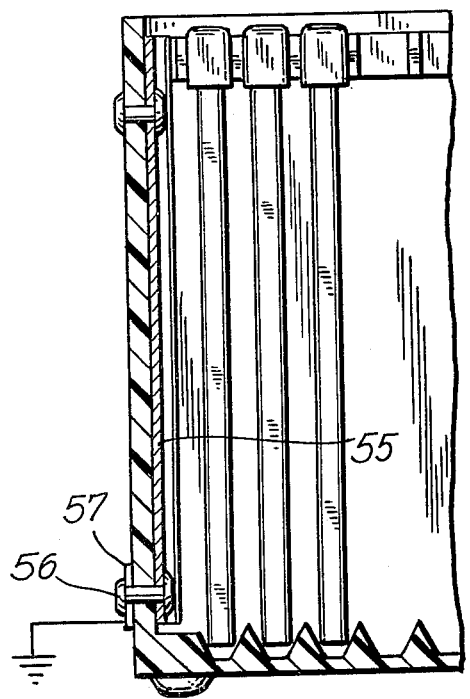
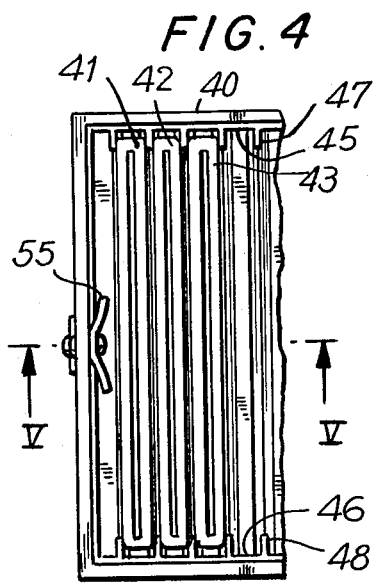

ELECTRICALLY CONDUCTIVE COVER SHEATH FOR DIELECTRIC RECORD DISCS AND THE LIKE

This application is a continuation-in-part of my application Ser. No. 833,454, filed Sept. 15, 1977 now abandoned.

This invention relates to protective cover sheaths for sound record discs and the like that are made of electric insulator material, and more particularly a cover sheath which will reduce the tendency of electrical charge to accumulate on the surface of the record disc.

Sound record discs, now commonly made of synthetic resin, are conventionally provided with a paper dust cover, often in addition to a cardboard jacket that provides breakage protection. These coverings are designed to prevent the accumulation of dust and dirt on the surface of the synthetic resin disc. These known protective covers, are able to provide this protection against dust and dirt only unsatisfactorily on account of the generation of electric charge on the synthetic resin plate, by which the dust is particularly strongly attracted. It is difficult to remove such dust contamination because of the attraction forces provided by the electric charge. In the case of record discs, the dust layers lead to an increased wear of the record and consequently to impairment of the sound reproduction quality. In spite of the seriousness of these disadvantages of the known packaging of sound records, up to now no relief of these difficulties has been available.

It is an object of the present invention to overcome the accumulation of dust on synthetic resin plates resulting from electric charge.

SUMMARY OF THE INVENTION

Briefly, a cover sheath for a synthetic resin plate such as a sound record disc, is made of a metallized flexible insulating sheet material with the metallization so disposed as to be in contact with both the face surfaces of the disc. It is particularly useful to make the cover sheath according to the invention of metallized paper.

Even if the metallization is only on the inside of the sheath pocket, concentration of electric charges is prevented by contact of the metallized layer against the synthetic resin plate surfaces. Preferably, it is with external connections, either the covers of other records or a grounded structure. This can be done by folding back the material around the entrance to the pocket, as a cuff, or the material of the cover sheath may be metallized on both sides with the two metallized layers being electrically connected to each other.

The cover sheaths of the present invention provide an effective protection against contamination of the synthetic resin records by dirt and dust attracted by electrostatic charge. The sheath can be made of material produced in large quantities, as for example sheet material manufactured for the production of capacitors, or metallized paper used as a graphic medium. There is also the further advantage that cover sheaths according to the invention can be made on the same machines on which covers for phonograph records are made today.

A particularly good protective effect is obtained if the conducting part of the cover sheath according to the invention can also be grounded or connected with a negative potential. This can be done in a very simple and practical way for sound records, for example, by providing the covers with an external conducting portion by which adjacent covers will be connected electrically whenever they and their contents are simply placed side by side and providing a conducting storage holder for holding a group of records so covered, the conducting holder then being grounded or connected to a negative potential.

The invention is further described by way of example with reference to the annexed drawings, in which:

FIG. 2 is a cross-section, partly broken away, of a record disc in a sheath that is made of paper metallized on both sides thereof;

FIG. 3 is a partial cross-section of a record in a sheath of the kind shown in FIG. 1, made of paper metallized on one side only, and FIG. 4 is a top view of a box for holding sheaths according to the invention, broken away to show only one end and FIG. 5 is a cross-section of the box of FIG. 4 along the line V—V.

Figure 1:
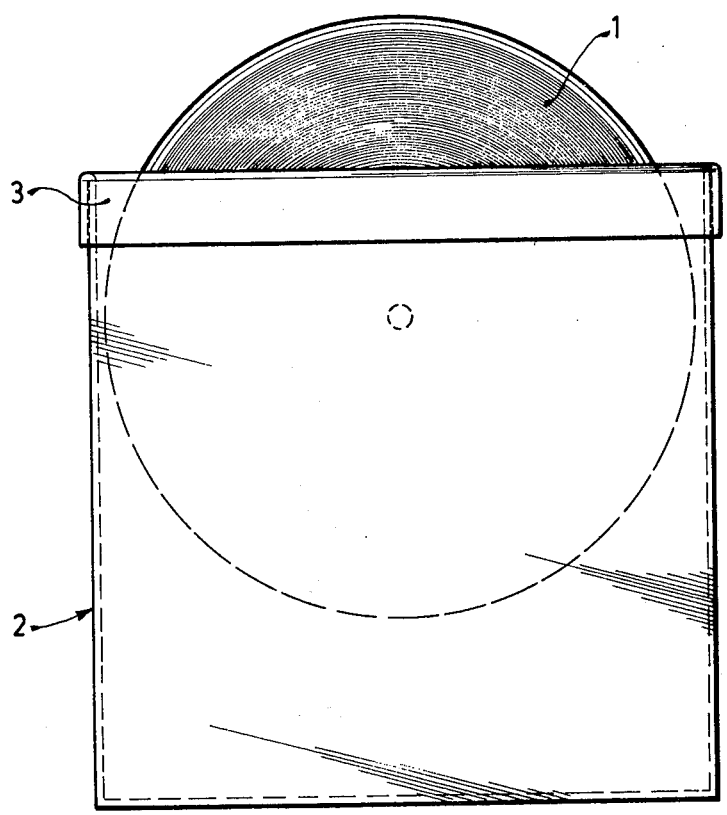
FIG. 1 is a face view of a sound record partly inserted into a cover sheath.

In the drawing, there is shown a sound record disc 1 provided with a flat square pocket-shaped dust cover 2 into which it can be fully inserted. At its upper edge 3 where the entrance to the pocket is located, the cover material is folded over outwards. By the use, as the material of the cover, of paper metallized on one side by vapor deposition, so that the metallized side of the paper cover lies against the sound record 1, the further provision of the cuff-like edge 3 makes it possible to provide an external metallization that is electrically connected with the internal metallization of the cover sheath, so that any electric charge that may be formed on the sound record can be conducted away to the outside. This draining away of charge is not necessary in every case, for it has been found sufficient for many cases simply to spread the electrostatic charge over the surface evenly by means of the electrically conducting cover sheath, thus reducing the charge to a relatively low value.

Instead of the sheath metallized on one side as illustrated, it is possible to use a cover sheath made of material metallized on both sides or even a conductive material produced by inlaying of metal or carbon particles or strands, in which case the cuff-like edge 3 is no longer necessary.

The cover sheath according to the present invention is particularly advantageous for the packing of sound records. In playing record discs of great value with the newer kinds of playback devices, very high frequencies are reproduced that extend to just over the hearing limits of the human ear. Sizzling and crackling noises that are caused by electrical discharges at the disc surface and/or by dust particles in the grooves of the record produce considerable disturbance of these recordings of wide-frequency range. The dust particles in the groove cannot be removed even by careful cleaning of the record, because they are held fast by the electrical field strength at the disc surface. High surface charges, partly varying by location on the record disc, can find a way to even out upon playback and thus also produce crackling noises.

When record discs are made of a material of high dielectric quality with a specific conductivity that is extremely small, electric charges are produced in part at the beginning when the discs are formed by injection or pressing. To a greater extent, charges are generated, however, by rubbing with other materials that are good insulators, particularly by rubbing against the cover sheath that is usually provided. Charges furthermore arise even during playback or during the cleaning of records with unsuitable cleaning cloths. As a result of the disadvantages above described, the following objectives may be set: charges already established on the records should be eliminated during the storage period; for this purpose, a very low electrical conductivity between the record surface and an opposite potential is already enough, since the storage periods greatly exceed the periods of use. Furthermore, the record should not be charged up by the process of being taken out of its cover sheath, nor by being inserted, so that it should be possible to play the record without any special preliminary cleaning or discharging.

If instead of the paper that is conventionally used today for dust covers of record discs there is used paper that is metallized at least on one side, such as the paper, for example, that is known for electrographic visible recording for various kinds of instruments, the above-described disadvantages can be almost fully avoided. The metal layer must be located on the inner surface of the cover and have contact with the surface of the synthetic resin disc. If paper metallized on both sides, or a plastic film, metallized on both sides, that can be processed in machinery in the same way as paper, the conducting layers on the two sides of the film must be connected electrically with each other. It has been determined by experiments that when paper metallized on one side is used as a protective cover for a record disc, the electrical field strength on the surface of the record disc is reduced by the factor of $10^3$.

Measurements have been made on the effectiveness of the invention as follows.

The electrical charge on each side of a synthetic resin record disc was measured in terms of the electrical field strength at a spacing of 5 cm from the disc surface by known methods. Electrical field strengths in the order of magnitude of 100,000 volts per meter were thus found to be usual for normally handled record discs. The field strengths measured at this spacing may further be regarded as a measure for the dust accumulation tendency, since the effect of the electric field strength induces opposite electric charges on the side of dust particles turned towards the record disc which charges are proportional to the local electric field strength. Furthermore, the force with which a movable electric charge moves along a line of force of the field is likewise proportional to the field strength. Attraction forces for the dust particles, therefore, are proportional to the square of the measured field strength.

In a particular case, a measurement was first made for a record disc just taken out of a synthetic resin film dust cover, the field strength being measured as +95,000 V/m. After a discharge of the record disc in ionized air, the field strength amounted to only −300 V/m. Then the record disc was put into a metallized cover sheath and again normally removed therefrom. The field strength then measured was −700 V/m. The record disc was again discharged, after which the field strength measured +70 V/m. The record was then again placed in a metallized sheath cover and normally removed from it, after which the field strength amounted to −1200 V/m. After once more discharging the record disc, a field strength of −120 V/m was determined. In a final check in which the record disc was again normally inserted in a plain synthetic resin film cover sheath, the measurement again showed a field strength of +90,000 V/m. Thus, merely from the removal of a record disc from a synthetic resin cover sheath, discharges approximately a thousand times as great are produced than are produced by removal from a cover sheath according to the invention.

A second series of measurements was made to determine whether these effects are also to be found when the record is inserted and removed without being discharged in between. In this case, the field strength measured after repeated insertion and removal was from 120,000 to 140,000 V/m, but when thereafter the record disc with this high charge was inserted in a metallized cover sheath, removed and repeatedly and removed, a field strength of 30,000 V/m could still be measured. This corresponds to reduction of the original charge to about one-quarter, and hence a reduction of the dust accumulation danger by a factor of 1/16. In accordance with the present invention, therefore, it is considered that the synthetic resin plate, in the particular case of the record disc, ought not only to acquire no substantial charge by being removed from its cover sheath, but also that remaining charges that may be present when it is inserted in its sheath cover should preferably be drained away. This last effect can be obtained with the above-described metallization of the cover sheath, either on one side of the sheet material or on both sides. If the cover sheath is metallized on both sides and the two sides are somewhere in electrical contact, the charges picked up on the inside will be conducted to the outside. In the case of a cover sheath that is metallized only on the inside, the leading away of the charge can be provided by a folded-over metallized edge or by including electrically conducting praticles, as for example carbon black, in the manufacture of the cover sheath material, as for example by mixing carbon black in the pulp from which paper to be used for the cover sheath is made. For cover sheaths of this kind, a further series of measurements has shown that after insertion of the record disc in the cover sheath and subsequent touching for a short time of a conducting part of the cover sheath with a grounded conductor, the remaining charges are brought back down to about 1 to 5% of the original value.

For the ordinary case, it does not appear to be necessary to ground the record disc covers, much less to connect them to a negative potential. A sufficient discharging can rather be provided by normal use of record discs in the course of time just by storing them with a conductive outer wrapping that needs to have only a low conductivity (in mhos, which means that the ohmic values of the conducting members may be quite high). One may for example provide the conductive nature of the outer wrapping by metallization to obtain the carrying away of the charges on the surfaces of the synthetic resin discs. If two wrappings are provided one within the other, as is common, for each individual record disc, however, a good draining of the electric charges can be provided simply by a portion of the inner conductive covering material folded over the outer cover in the fashion of a cuff in the vicinity of the surface of the synthetic resin disc.

FIG. 2 shows a cross-section of a partly broken away, of a sheath in which a record 1 has been inserted. In this case the pocket is made of two paper sheets 11 and 12 joined together around the edges and metallized on both sides, as shown by the metal layers 13, 14, 15 and 16, the thickness of which is exaggerated in the figure. Although these layers are not shown extending to the edges where the sheets 11 and 12 are joined, it is in no way necessary to avoid metallizing the sheets all the way to the edges. The section shown is not down the middle of the sheath but rather off center, for which reason the record 1 is shown as not extending either to the bottom of the sheath or to the top. In the lower corner spaces rivets 21 and 22 are provided to form a conductive connection between the inner and outer metallization layers, the rivet 21 connecting the layer 13 with the layer 14 electrically and the rivet 22, which does not pass through the sheet 12 in the plane of the paper, being offset somewhat with regard to the rivet 21, connects the layers 15 and 16 electrically together.

FIG. 3 shows the cross-section of a sheath of the kind shown in FIG. 1, only the portion near the mouth of the sheath being shown. In this case the paper sides 31 and 32 of the pocket in which the record 101 is held are metallized, respectively at 33 and 34 on the sides facing inward, but these meatllization layers are carried around to the outside of the pocket by folding over the paper sheets 31 and 32 to form cuffs 37 and 38.

FIG. 4 shows one end of a box structure 40 for storing records incased in sheaths of the kind shown in FIGS. 1 and 3, with three such filled sheaths 41, 42 and 43 shown in place. At the level of the cuff illustrated in FIG. 3, namely near the top of the box, metal strips 45 and 46 are fixed along the top of the long sides of the box that are provided with fins such as the fins 47 and 48 designed to extend between the edges of adjacent record sheaths and make electrical contact with the outer metallization provided on the cuffs at the locations 49 and 50 shown in FIG. 3. These strips have extensions going around the end of the box so that they can make contact with a central strip 55 going down to the bottom of the box where it is connected with a rivet or machine screw 56 to a terminal lug 57 that can be grounded if desired.

In FIG. 4 the sound record discs and their sheaths are not shown in cross-section to simplify the drawing.

I claim:

1. A protective cover sheath on a synthetic resin plate such as a sound record disc, capable of reducing electrostatic charges on the plate and the consequent attraction thereof for dust, constituted by a flat pocket made of flexible insulating sheet material which is metallized on both sides with a continuous vapor-deposited metal coating and which fits over and covers the synthetic resin plate and is in area contact with both face surfaces therof, the metallizing layers on opposite sides of said material being electrically connected with each other.

2. A protective cover sheath on a synthetic resin plate as define in claim 1, in which said pocket is made of metallized paper.

3. In combination, a plurality of protective cover sheaths as defined in claim 1, each covering a different synthetic resin plate, means for holding said sheaths and their contents in a storage position, and means for connecting the electrically conducting material of said sheaths to an electrical ground potential.

4. A protective cover sheath on a synthetic resin plate such as a sound record disc, capable of reducing electrostatic charges on the plate and the consequent attraction thereof for dust, constituted by a flat pocket made of flexible insulating sheet material metallized on one side with a continuous vapor-deposited metal coating and fitting over and covering the synthetic resin plate in such a way that the metallized surface of said flexible material is in area contact with both the face surfaces of said synthetic resin plate, said metallized sheet material of the pocket being folded over outwards as a cuff (3) at the entrances to the pocket to provide a portion of said metal coating on the outside of said pocket for readily grounding said coating electrically.

5. In combination, a plurality of protective cover sheaths as defined in claim 4, each covering a different synthetic resin plate, means for holding said sheaths and their contents in a storage position, and means for connecting the electrically conducting material of said sheaths to an electrical ground potential.

6. A protective cover sheath on a synthetic resin plate as defined in claim 4, in which said pocket is made of metallized paper.

* * * * *